United States Patent [19]

Dankowski

[11] Patent Number: 5,464,196
[45] Date of Patent: Nov. 7, 1995

[54] VIBRATION ISOLATOR

[75] Inventor: John C. Dankowski, San Dimas, Calif.

[73] Assignee: Fabreeka International, Inc., Stoughton, Mass.

[21] Appl. No.: 230,391

[22] Filed: Apr. 20, 1994

[51] Int. Cl.⁶ ..................................................... F16M 1/00
[52] U.S. Cl. ..................... 267/140.13; 267/140.11
[58] Field of Search .................. 267/140.13, 140.11, 267/140.3, 64.27, 139, 35, 152, 141, 219; 188/298; 180/300, 312; 248/562, 636

[56] References Cited

U.S. PATENT DOCUMENTS

| | | | |
|---|---|---|---|
| 3,001,783 | 9/1961 | Moody | 267/34 |
| 3,118,659 | 1/1964 | Paulsen | 267/35 |
| 3,836,134 | 9/1974 | Lowe et al. | 267/152 |
| 4,399,987 | 8/1983 | Cucelli | 267/140.13 |
| 4,673,168 | 6/1987 | Warmuth | 267/64.27 |
| 4,757,982 | 7/1988 | Andra | 267/152 |
| 4,971,298 | 11/1990 | Roos | 267/140.13 |
| 5,094,433 | 3/1992 | Dan | 267/140.13 |
| 5,127,636 | 7/1992 | Spaltofski | 267/140.13 |
| 5,139,240 | 8/1992 | Miyamoto | 267/140.13 |

Primary Examiner—Robert J. Oberleitner
Assistant Examiner—Clifford T. Bartz
Attorney, Agent, or Firm—Donald Brown

[57] ABSTRACT

A shock and vibration isolator having a diaphragm and a bumper attached to the diaphragm. The bumper is also provided with a damper attached to the bumper. The isolator has an internal chamber in which an incompressible fluid and a compressible fluid within the chamber are in contact with each other and in which the damper is submerged. The diaphragm has a flexible fabric imbedded in the diaphragm and extending into the sidewall.

8 Claims, 1 Drawing Sheet

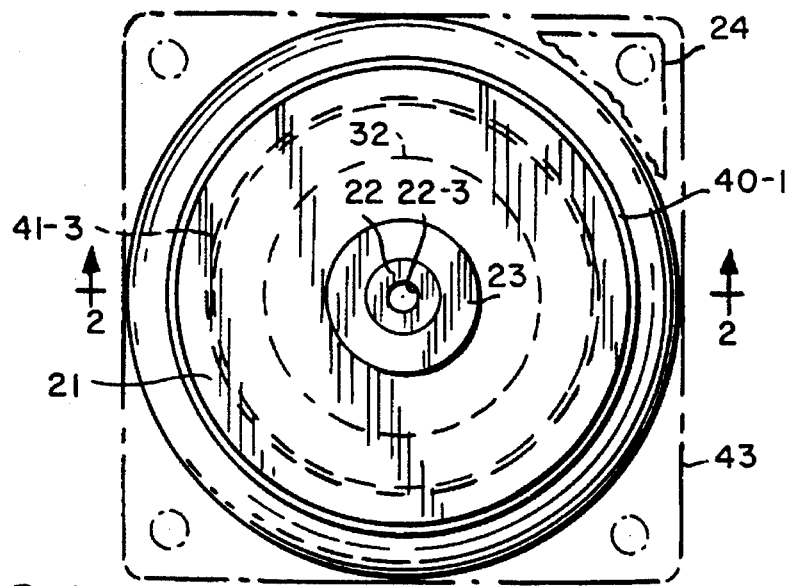
FIG. 1
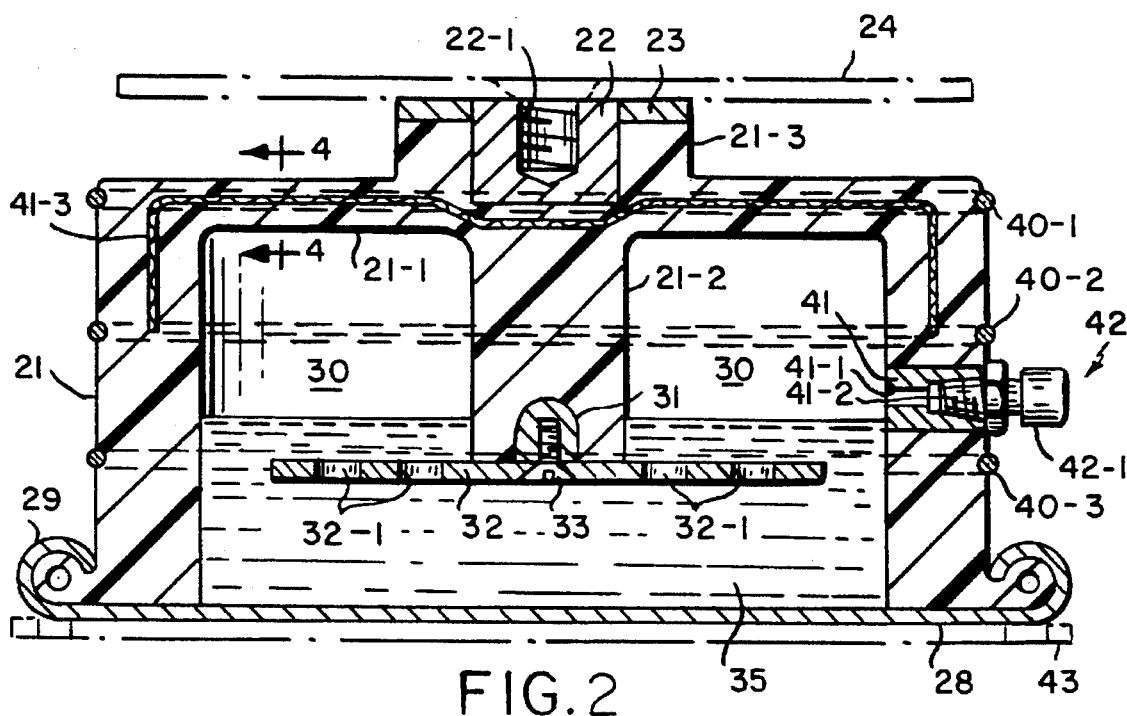
FIG. 2
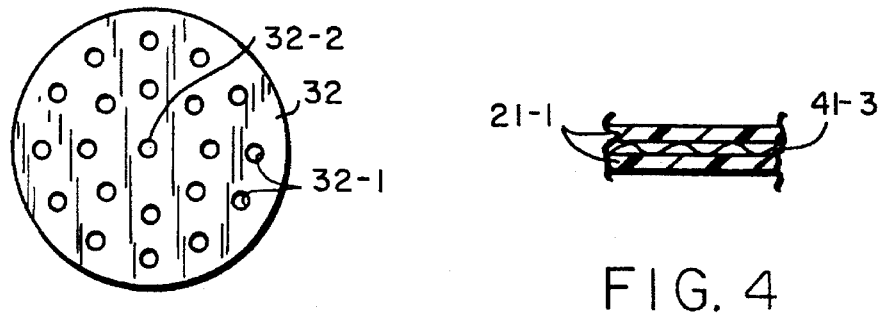
FIG. 3
FIG. 4

VIBRATION ISOLATOR

BACKGROUND OF THE INVENTION

The present invention is directed to a new and improved shock and vibration isolator. The isolator of this invention is used to support loads to attenuate shock and vibrating dynamic inputs so as to significantly reduce these disturbances to an acceptable level.

The invention disclosed herein will reduce the above inputs from the ground to a supported payload or reduce payload disturbances from being transmitted into the ground.

The isolator of this invention will have as some of its major use in machine shops in connection with the support of measuring tools and instruments to isolate tools and instruments from the shop floor.

Prior art vibration isolators are shown in U.S. Pat. Nos. 3,836,134, 3,118,659 and 3,001,783.

BRIEF DESCRIPTION OF THE INVENTION

The present invention is to a three phase pneumatic/elastomeric vibration isolator.

The isolator of this invention provides three distinct isolators in one.

With no air above atmospheric pressure in the isolator and the payload resting on the elastomeric diagram shoulder crown, an upper natural frequency is provided in this mode and the isolator primarily provides shock isolation.

When pressurized sufficiently to raise the isolator, but not allowing the positioning portion of the isolator to float, a mid natural frequency is obtained. The air pressure extends the isolator height while the payload still rests on the vertical, stretched elastomeric crown. This mode provides shock and vibration isolation.

When pressurized fully, the piston will rise and support the payload which is now off the elastomeric crown collar, thus providing the optimum isolation at the lowest natural frequency. This mode is for vibration isolation.

In this invention the elastomeric diaphragm preferably includes a synthetic fabric therein to allow for higher internal air pressures, thus supporting very heavy payloads with a high degree of safety.

In addition in this invention an internal bumper preferably provides the added feature of shock isolation when the piston downward stroke is exceeded.

Further in this invention an internal damper which is attached to internal bumper provides internal damping when partially filled with a viscous fluid and the balance of the volume with air.

BRIEF DESCRIPTION OF THE DRAWINGS

FIG. 1 is a top plan view of the isolator of this invention;

FIG. 2 is a sectional view taken along line 2—2 in FIG. 1;

FIG. 3 is a plan view of the damping disc of FIG. 2; and

FIG. 4 is a sectional view taken along line 4—4 in FIG. 2.

DETAILED DESCRIPTION OF THE INVENTION

Reference should now be had to FIGS. 1 to 4 for a description of the invention.

At 21 there is shown an elastomeric base having a thinner walled diaphragm portion 21-1 and which may be constructed by molding. The base 21 may be made from material such as neoprene, nitrile synthetic elastomers of other elastomers. A payload (e.g. a machine for which isolation is to be provided) may be mounted to an inset 22 e.g. of metal or plastic having a threaded hole 22-1. The insert is preferably surrounded by a washer 23 as shown so that a load may be easily supported. If desired a load plate 24 shown dotted may be used to allow the payload to be uniformly distributed on the isolator collar portion 21-3 of the elastomeric base 21.

The outside of the elastomeric base is provided with a bottom 28 e.g. of steel which is rolled over at 29 to provide a seal to a ring formed on the base 21.

The isolator has a chamber 30 (preferably generally cylindrical in shape) for fluids, (air or liquids such as oils or a combination of both). An elastomeric bumper 21-2 which is part of the base 21 is provided and which extends downwardly into the chamber 30 towards the bottom 28.

A threaded insert 31 is provided in the bumper 21-2. A damping plate 32 is provided which is coupled to the insert 31 by screw 33 through center hole 32-2. The damping plate 32 has a plurality of holes 32-1 in the e.g. steel plate in the pattern shown in FIG. 3. In the preferred embodiment of the isolator an outer row of 12 outer holes and an inner row of 7 holes is provided. The number of holes and placement thereof can be changed by one skilled in the art to obtain the desired damping characteristics.

The chamber 30 is normally partially filed with a viscous damping fluid e.g. oil 35 in the lower portion thereof and in which the damping plate is positioned and submerged. As the damping plate (shown as preferably round) moves up and down in the oil 35, the oil 35 flows through the holes 32-1 and thus there is provided a controlled damping effect. By changing the hole position, size or number one can change the damping effect if desired. The damping fluid (oil) which is acceptable includes Mystik®Viscid Lube® Oil conditioner or other viscous oils.

The Mystic®Viscid Lube® oil conditioner has a viscosity index of 125 and is sold e.g. by Nickey Petroleum Co., Inc. of Santa Ana, Calif.

On the side of the elastomeric base 31 there is provided a core 41 e.g. of metal in which there having a port 41-1 and a counter sunk threaded opening 41-2 for receiving a conventional Schrader air valve 42 e.g. a tire type air valve. The air valve 42 is provided with a sealing cap 42-1 as used with the tire air valve used in a tire.

The damping fluid may be provided into the chamber 30 through the port 41-1 prior to inserting the Schrader valve.

In place of the core 41 and valve 42 assembly as noted above, the outer wall of the elastomeric base may be changed to receive the air valve such as shown in U.S. Pat. No. 3,836,134 (which contents are incorporated herein by reference hereto) and a separate closeable opening may be provided in the member 28 for inserting the damping fluid into the chamber 30.

At the outside of the base member 21, there is provided annular rings e.g. of steel 40-1, 40-2 and 40-3 to help the base member 21 retain its shape when in use.

In order to preferably provide extra strength to the thinner diaphragm portion 21-1, there is provided a fabric layer 41-3 e.g. made of material such as Dacron® material. Dacron® is a Dupont trademark. The fabric is positioned in the base during molding thereof.

The Dacron® polyester fabric used preferably is one having 42±2 threads inch, thread diameter of 0.012±0.001 inches, weight 3.50±0.1502/YD² and mullen burst strength of 225 lbs/inch.

When air pressure supplied to the interior of the chamber at e g 20 lbs/in², the isolator is used to primarily provide shock and vibration.

When the isolator chamber 30 is pressured with air at e.g. 85 lbs/in², it is used to primarily provide vibration isolation.

In general the isolator will be pressurized to between 40 lbs/in² to 90 lbs/in² depending on the requirements of the user.

If desired an optional base mount 43 may be provided and affixed (e.g. welded or bonded) to the external bottom or to the portion 29 so that the complete assembly may be mounted to the floor or other type of substrate. Mounting holes e.g. may be provided in the base mount.

Other damping oils which may be used may be of a petroleum base, synthetic petroleum base or of a silicon base.

As may be seen, this invention eliminates the difficult problem of air leakage at the base of the isolator, provides a vertical stroke bumper 21 in the event the vertical working stroke is exceeded, and preferably includes a fabric material 41-3 as a strengthening member in the annular diaphragm 21-1 (base) to support high loads. Also by use of the fabric 41-3, a thinner diaphragm section 21-1 (top of base 21) can be used thereby improving the isolation vibrator attenuation performance.

I claim:

1. A shock and vibration isolator comprising a unibody elastomeric assembly having a load bearing annular sidewall with a top annular diaphragm and a bottom metal plate defining a chamber, the diaphragm including an integral shock absorber portion extending from the center of said diaphragm into said chamber and said shock absorber portion having a free end, a damping plate having a plurality of openings and attached to said shock absorber portion free end, said sidewall having an integral annular lip, said metal plate having a portion rolled over said annular lip to seal the assembly to said metal plate, said diaphragm having a flexible fabric embedded therein, said fabric extending into and embedded in said sidewall, an incompressible fluid partially filling said chamber and a compressible fluid in said chamber not separated from each other and in contact with each other at all times, said damping plate being submerged in said incompressible fluid during normal operation and said diaphragm having an integral raised elastomeric interface portion smaller in area than the area of said diaphragm and a plate supported by said raised elastomeric interface portion.

2. The isolator of claim 1 in which said metal plate comprises steel.

3. The isolator of claim 1 in which the fabric is polyester.

4. The isolator of claim 2 in which the fabric is polyester.

5. The isolator of claim 1 in which a self sealing gas valve is positioned in the load bearing annular side wall.

6. The isolator of claim 5 in which the fabric is polyester and the metal plate is steel.

7. The isolator of claim 1 in which the incompressible fluid is oil.

8. The isolator of claim 6 in which the incompressible fluid is oil.

* * * * *